US010823129B2

(12) United States Patent
Hesketh et al.

(10) Patent No.: US 10,823,129 B2
(45) Date of Patent: Nov. 3, 2020

(54) METHODS AND SYSTEMS FOR CONTROLLING A STARTER MOTOR

(71) Applicant: Ford Global Technologies, LLC, Dearborn, MI (US)

(72) Inventors: David Hesketh, Ingatestone (GB); Gary Paisley, Romford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 16/052,496

(22) Filed: Aug. 1, 2018

(65) Prior Publication Data
US 2019/0055911 A1 Feb. 21, 2019

(30) Foreign Application Priority Data

Aug. 21, 2017 (GB) .................................. 1713367.9

(51) Int. Cl.
*F02N 11/08* (2006.01)
*F02D 41/04* (2006.01)
*F02D 41/06* (2006.01)

(52) U.S. Cl.
CPC ........ *F02N 11/0844* (2013.01); *F02D 41/042* (2013.01); *F02D 41/065* (2013.01); *F02N 11/0855* (2013.01); *F02N 11/0848* (2013.01); *F02N 2200/022* (2013.01); *F02N 2200/0802* (2013.01); *F02N 2300/102* (2013.01); *F02N 2300/2002* (2013.01)

(58) Field of Classification Search
CPC .. Y02T 10/48; F02N 11/0814; F02N 11/0844; F02N 11/0818; F02N 11/0822; F02N 11/0825; F02N 11/084; F02N 11/0833; F02N 11/0829; F02N 11/0837

USPC ....................................................... 123/179.4
See application file for complete search history.

(56) References Cited

U.S. PATENT DOCUMENTS

| 6,024,065 A * | 2/2000 | Hojna ................. F02N 11/0851 123/179.3 |
| 2012/0172175 A1* | 7/2012 | Nedorezov ........... B60W 10/06 477/169 |
| 2013/0255614 A1 | 10/2013 | Kitano et al. |
| 2013/0296121 A1* | 11/2013 | Gibson .................. B60K 6/387 477/5 |

(Continued)

FOREIGN PATENT DOCUMENTS

| JP | 2013177874 A | 9/2013 |
| WO | 2014073391 A1 | 5/2014 |

OTHER PUBLICATIONS

Osawa, K. et al., Abstract of "Starting System for Stop/Start with Change of Mind," Proceedings of the FISITA 2012 World Automotive Congress, Nov. 27, 2012, Beijing, China, 2 pages.

*Primary Examiner* — Sizo B Vilakazi

(74) *Attorney, Agent, or Firm* — Geoffrey Brumbaugh; McCoy Russell LLP

(57) ABSTRACT

Methods and systems are provided for dealing with a change of mind event during an automatic shut-down of an engine in which the speed at which a starter motor used to restart the engine is disengaged is based upon the comparison of current engine speed (N) with a cranking speed limit ($S_{LIM}$). In one example, during an engine restart while the engine is spinning down, the starter motor may crank the engine to a threshold cranking engine speed adjusted based on a position of the gear.

20 Claims, 5 Drawing Sheets

(56) References Cited

U.S. PATENT DOCUMENTS

2013/0297191 A1\* 11/2013 Gibson ................ B60W 10/06
                                                                          701/112

\* cited by examiner

METHODS AND SYSTEMS FOR CONTROLLING A STARTER MOTOR

CROSS REFERENCE TO RELATED APPLICATION

This application claims priority to Great Britain Patent Application No. 1713367.9, filed Aug. 21, 2017. The entire contents of the above-referenced application are hereby incorporated by reference in its entirety for all purposes.

FIELD

This application relates generally to the automatic stopping and starting of an internal combustion engine in the event of a change of mind following an engine shut down request.

BACKGROUND/SUMMARY

In current motor vehicles equipped with an "automatic start-stop" system, the engine is automatically turned off whenever possible in order to save fuel and reduce emissions. It is a problem when the engine has to be re-started once it has begun to shut-down, in what is often referred to as a 'Change of Mind Event' (CoM) that the state of a driveline is not always in a fully open state.

A CoM occurs when a driver interrupts an automatic engine shut-down due to a change of circumstances before the engine has actually stopped. A CoM can occur at any time during an engine shut-down process because, for example, a set of traffic lights has changed to green just as the engine has begun the spin down or the driver is able to enter a traffic flow at a roundabout or junction due to a gap in traffic as the engine is in the process of stopping.

To minimise driver dis-satisfaction and a sense of unresponsiveness it is desirable that the engine is returned to its normal running condition as quickly as possible in such circumstances. In some cases when the CoM occurs early in the engine shut-down this can be achieved by simply increasing the air and fuel supply and, in the case of a spark ignited engine, providing ignition to the engine in what is often referred to as a "passive restart" but at other times, when the engine speed and resulting kinetic energy is insufficient for a successful restart, it is necessary to engage a starter motor to crank the engine.

In some cases the starter motor can be engaged even if the engine is still rotating at low speed a so called "active CoM with early engagement" but in other cases where the engine speed is very low it is necessary to wait for the engine to come fully to rest before engaging the starter motor.

In either case, once the starter motor is engaged, the control system must decide when to turn it off again that is to say, when to dis-engage it. If the starter motor is dis-engaged too early the engine may fail to start successfully due to insufficient rotational speed of the engine, leading to an engine stall and as a consequence a failure of the vehicle to launch. Whereas, if the starter motor disengagement is too late the starter motor internal components will experience excessive wear due to the higher than normal speed of rotation and cranking duration and the NVH experienced by the driver will be degraded.

Current practice is to use a single speed limit for the starter motor disengagement that balances the robustness of start (surety of a successful start) against the detrimental NVH of having the starter motor engaged too long and this speed limit is based upon the assumption that the driveline is open.

However, the inventors herein have recognized potential issues with such systems. The existing trade-off of start robustness against NVH may not necessarily appropriate for a partially closed driveline state as can occur following a CoM. It may not be possible to choose a single calibration for starter motor dis-engagement which has optimal NVH for the open driveline case when the driver is not trying to launch the vehicle but which is also sufficiently robust to support an aggressive vehicle launch.

In one example, the issues described above may be at least partly addressed by a method of controlling a starter motor of a powertrain system having an engine and a driveline including a gearbox driven by the engine via a friction clutch, comprising: when there is requirement to use the starter motor to restart the engine following a change of mind during an automated engine stop, using the starter motor to crank the engine and disengaging the starter motor when a cranking speed limit is reached, the cranking speed limit based on whether the driveline is confirmed to be fully open. In this way, by cranking the engine until the engine speed reaches an adjustable threshold speed, engine restart during an engine spin-down may be improved.

In one example, according to a first aspect of the disclosure there is provided a method of controlling a starter motor of a powertrain system having an engine and a driveline comprising a gearbox driven by the engine via a friction clutch. The method comprises, when there is requirement to use the starter motor to restart the engine following a change of mind during an automated engine stop, using the starter motor to crank the engine and disengaging the starter motor when a cranking speed limit is reached, wherein the cranking speed limit is set based upon whether the driveline is confirmed to be fully open.

There may be a first cranking speed limit for use when the driveline is confirmed to be fully open and a second cranking speed limit for use when the driveline is not confirmed to be fully open. The method may further comprise checking whether the state of the driveline is fully open and, if the state of the driveline is confirmed to be fully open, setting the cranking speed limit to a first starter motor disengagement speed limit and otherwise setting the cranking speed limit to a second starter motor disengagement speed limit and using the set cranking speed limit to decide when to disengage the starter motor. Checking whether the state of the driveline is open may comprise checking whether the gearbox is one of not in-gear and in neutral.

The first and second starter motor disengagement speed limits may be based on respective predefined relationships between engine speed and an engine operating parameter that affects starting of the engine. The engine operating parameter that affects starting of the engine may be a temperature of the engine. The temperature of the engine may be engine coolant temperature. The second starter motor disengagement speed limit may be higher than the first starter motor disengagement speed limit whenever the engine temperature is above a threshold positive temperature.

According to another aspect of the disclosure, there is provided a powertrain system comprising an engine, a starter motor to start the engine, a driveline comprising a gearbox driven by the engine via a friction clutch and an electronic controller wherein the electronic controller is arranged, at least when there is requirement to use the starter motor to restart the engine following a change of mind during an automated engine stop, to use the starter motor to crank the engine and disengage the starter motor when a cranking speed limit is reached. The cranking speed limit is set based upon whether the driveline is confirmed to be fully open.

There may be a first cranking speed limit for use when the driveline is confirmed to be fully open and a second cranking speed limit for use when the driveline is not confirmed to be fully open.

The electronic controller may be further arranged to check whether the state of the driveline is fully open and, if the state of the driveline is confirmed to be fully open, may be further arranged to set a cranking speed limit to a first starter motor disengagement speed limit and otherwise set the cranking speed limit to a second starter motor disengagement speed limit. The set cranking speed limit is used to decide when to disengage the starter motor.

Checking whether the state of the driveline is fully open may comprise using one of a neutral gear sensor and an in-gear sensor to check whether the gearbox is one of not in-gear and in neutral.

In this way, by adjusting a threshold engine speed for engine cranking following an engine idle-stop based on a position of the gear, latency in vehicle response time may be reduced. By adjusting the threshold engine speed to which the engine may be cranked via a starter motor based on if the gear is at neutral position, engine noise, vibration, harshness (NVH) during engine restart may be reduced. The technical effect of cranking the engine to a distinct engine speed based on a gear position is that starter motor wear may be reduced. By adjusting the distinct engine restart speeds based on engine temperature, engine operation may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
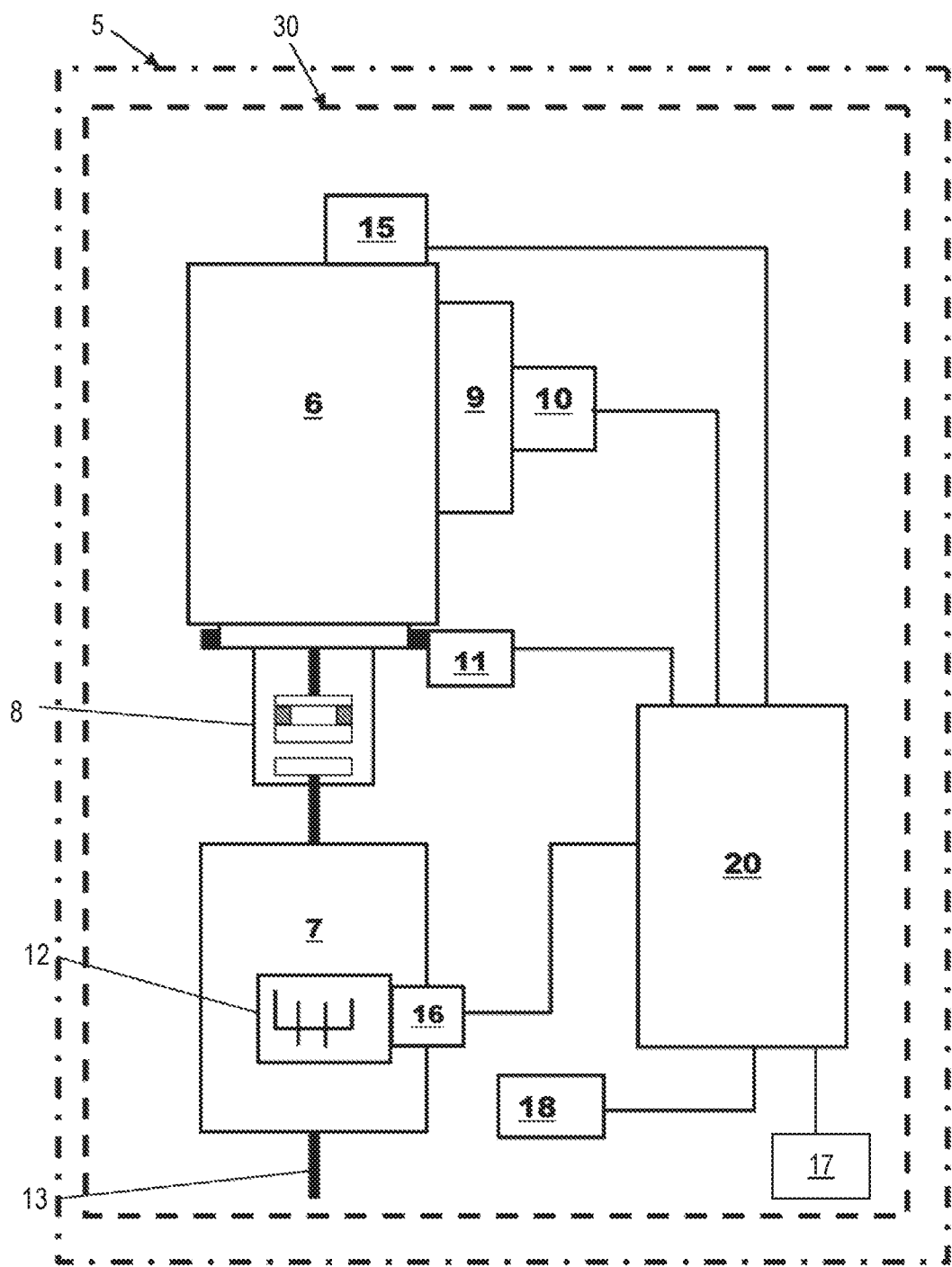
FIG. 1 shows a block diagram of a motor vehicle having an engine control system.
Figure 3:
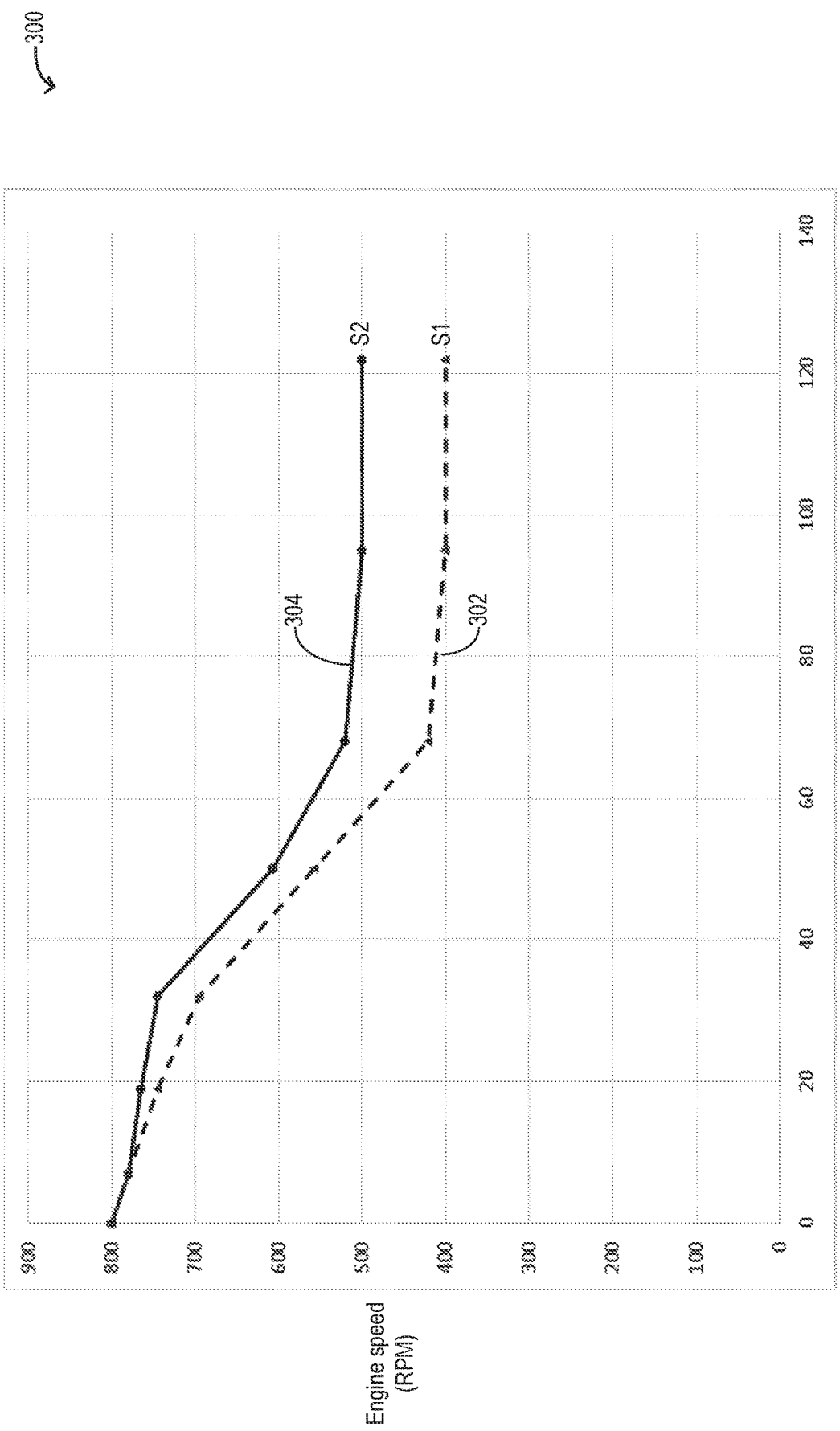
FIG. 3 is a chart showing a relationship between a starter motor disengagement speed limit in terms of engine speed and coolant temperature for open and not open driveline cases.
Figure 4:
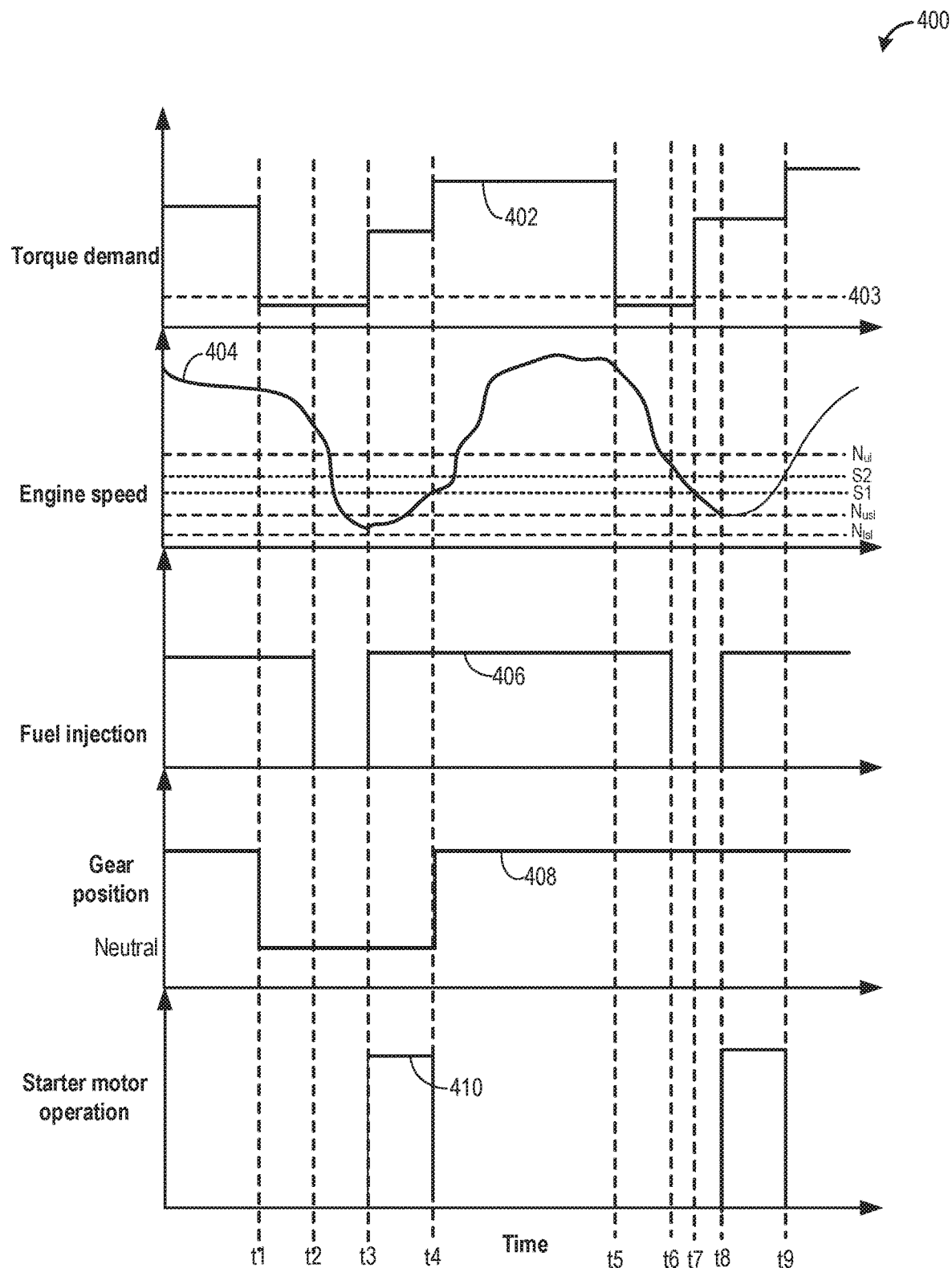
FIG. 4 shows an example operation of a starter motor based on gear position during engine restart.

The following description relates to systems and methods for engine restart after an engine idle-stop. As described with reference to an example engine system coupled to a motor vehicle system, as shown in FIG. 1, operation of a starter motor may be adjusted based on engine operating parameters and position of a transmission system gear. An engine controller may be configured to perform a control routine, such as the example routine of FIGS. 2A-2B, to adjust starter motor operation during an engine restart following an idle-stop. FIG. 3 shows a relationship between starter motor operation and engine temperature. FIG. 4 shows an example operation of the starter motor during the engine restart while the engine is still spinning down.

FIG. 1 there is shown a motor vehicle 5 having a powertrain system 30 having an internal combustion engine 6 which in this case may be a direct injection spark ignited engine but in other cases could be a diesel engine.

The engine 6 may have an inlet manifold 9 through which air flows to the cylinders (not shown) of the engine 6. The flow of air into the manifold 9 may be controlled by a throttle valve 10. Exhaust gases flow out of the engine 6 via an exhaust manifold and an exhaust system (not shown) which may include one or more emission control devices.

The engine 6 may drive a primary load via a flywheel and friction clutch assembly 8. A multispeed manual gearbox 7 may drive a final drive assembly (not shown) via an output shaft 13. The friction clutch is engaged and disengaged by a driver of the motor vehicle 1 operating a driver operable clutch pedal (not shown) as is well known in the art.

A gear selector mechanism 12 is used by an operator of the motor vehicle 5 to select a suitable one of a number of ratios within the gearbox 7.

The engine 6 has a starter motor 11 selectively driveably connected to the engine 6 via a pinion gear that engages with a ring gear fastened to the flywheel of the engine 6 when the starter motor is switched on as is well known in the art. The starter motor 11 may provide a source of motive power used to start the engine 6. A power source such as a battery (not shown) may be coupled to the start motor to provide energy during engine cranking.

The motor vehicle 5 may include an electronic controller 20 (also referred herein as electronic control unit ECU) forming part of the powertrain system 30 used to control the operation of the engine 6. Controller 20 is shown receiving information from a plurality of sensors 15 and 18 (various examples of which are described herein) and sending control signals to a plurality of actuators 17 (various examples of which are described herein). The electronic controller 20 receives information from a number of engine sensors 15 regarding the current operating state of the engine 6 such as for example, the rotational speed of the engine 6, the coolant temperature of the engine 6, engine oil temperature, the mass air flow into the engine 6 and may also receive other information regarding, for example the state of charge of a battery (not shown) used to power the starter motor 11 for the engine 6.

The electronic controller 20 also receives information from one or more driver input sensors 18 regarding the current operating state of various driver controlled devices such as, for example and without limitation, the position of a driver operable clutch pedal, the engagement state of a clutch forming part of the flywheel and clutch assembly 8, a brake pedal state and an accelerator pedal state.

The electronic controller 20 in the case of this example controls actuators 17 including the throttle valve 10 via a closed loop feedback system. The controller 20 may receive input data from the various sensors, process the input data, and trigger various actuators in response to the processed input data based on instruction or code programmed therein corresponding to one or more routines.

However, it will be appreciated that the electronic controller 20 could be replaced by a number of separate electronic controllers each having a specific task which are connected to one another to provide the desired functionality.

The electronic controller 20 also receives an indication of the engagement state of the manual gearbox 7 from a gearbox engagement state sensor 16. The gearbox engagement state sensor 16 may be one of a neutral gear state sensor and an in-gear state sensor and in either case provides an output indicative of whether a driving gear or neutral is selected in the manual gearbox 7. The purpose of this being to confirm whether or not a fully open driveline is present.

The electronic controller 20 uses the inputs from the engine sensors 15 and the driver input sensors 18 and, in some cases, the gearbox state sensor 16 to decide when to automatically stop and start the engine 6.

During operation of the powertrain system 30, the electronic controller 20 may decide when the engine 6 may be to be automatically stopped. The controller 20 may then takes the appropriate action to stop the engine 6 and continuously monitor the current rotational speed of the engine 6.

Upon initiation of an engine idle-stop, while the engine spins down, a change of mind (CoM) may occur when a driver interrupts the automatic engine shut-down due to a change of circumstances and requests engine spin-up (for increased torque output). A CoM may occur at any time during an engine shut-down process. If a CoM event occurs during the shut-down of the engine 6, the electronic controller 20 may respond in a plurality of ways depending upon the current speed (N) of the engine 6, the current coolant temperature and whether the manual gearbox 7 is or is not in neutral as sensed by the gearbox state sensor 16.

It will be appreciated that the engine 6 may be stopped in several ways in which the torque is reduced sufficiently to produce an engine stop, these include, one or more of cutting the fuel supply to the engine 6, cutting an ignition system in the case of a spark ignited engine, adjusting spark timing, modulating the ignition, adjusting injection timing, modulating fuel injection, and switching off fuel injectors.

One example of a CoM event is when during a shut-down of the engine 6, the driver performs some action which indicates that the engine 6 should be kept running. For example, in the case of the manual gearbox 7, if the driver has removed their foot from an accelerator pedal, released a clutch pedal and placed the gearbox 7 into neutral and then during the shut-down (spin down) of the engine 6 the driver presses the clutch pedal again and places the manual gearbox 7 back into gear, it would constitute a CoM.

In response to a CoM event, the ECU 20 checks the current engine speed (N) and, if it is found to be higher than an upper speed limit (NUL) then it may be passively restarted because the rotational speed of the engine 6 may be sufficiently high for restarting to take place without the use of the starter motor 11. In such a case the requirements for engine running are restored such as restarting a supply of fuel to the engine 6 and, in the case of a spark ignited engine, restoring normal ignition to the engine 6 may automatically be returned to a running state (such as to the requested engine speed at which the torque demand may be fulfilled)). The upper speed limit (NUL) may vary from engine to engine based upon engine size and configuration. In one example, the upper speed limit (NUL) may be 600RPM.

However, if the speed of the engine 6 when the CoM occurs is below the upper speed limit (NUL) then use of the starter motor 11 may be requested to restart the engine 6.

However, engagement of the starter motor at very high speeds may result in damage occurring to the various driven components such as a flywheel ring gear and a starter motor pinion gear and therefore engagement of the starter motor may be postponed until the speed of the engine 6 has dropped below an upper start speed limit (NUSL).

In addition, a lower start speed limit (NLSL) may be used to inhibit engagement of the starter motor 11 when the engine speed approaches zero. This is because the engine is likely to rotate backwards slightly just before stopping and engagement of a starter motor with a reversing engine may be avoided to reduce the possibility of damage to the starter motor. If the engine speed (N) is less than the lower start speed limit (NLSL), the engine 6 is allowed to come to a complete halt before the starter motor 11 is engaged to restart it.

The upper and lower start speed limits (NUSL) and (NLSL) may depend upon the actual construction of the starter motor 11 and associated components. In one example, the upper start speed limit (NUSL) may be 200-250 RPM and the lower start speed limit (NLSL) may be 50 RPM. These values may be pre-calibrated and stored in the electronic controller 20 as predetermined values for use by the electronic controller 20 in determining whether the current engine speed (N) is within a starter motor restart region.

In the case where the engine speed (N) is within a starter motor restart region bounded by the upper and lower start limits (NUSL) and (NLSL) then the starter motor 11 is engaged immediately to crank the engine 6 so as to restart it.

In some cases the ignition may remain activated and unaltered during an automatic stop and only the fuel may be cut or altered to produce a stop and is re-supplied to produce a restart and in other cases both the fuel and ignition are cut or adjusted to produce a stop.

During engine crank up via the starter motor 11, the engine speed (N) at which the starter motor 11 may be disengaged may be based upon a comparison of the current engine speed (N) with a cranking speed limit (SLIM). The cranking speed limit (SLIM) may be the maximum engine speed for which cranking of the engine 6 is allowed. In one example, the cranking speed limit (SLIM) may be the actual rotational speed of the starter motor 11. However, by directly comparing the engine speed to the cranking speed limit (SLIM) for determining disengagement of the starter motor, additional software or hardware may not be required.

If the engine speed (N) is equal to or greater than the set cranking speed limit SLIM then cranking may be terminated and the starter motor 11 may be disengaged. The cranking speed limit SLIM may be not a fixed value but may be based upon whether or not the gearbox 7 is or is not in neutral. That is to say, whether it can be confirmed that the motor vehicle 1 is operating with a fully open driveline.

The cranking speed limit (SLIM) may be calibrated differently for different driveline states. In the case when it can be confirmed that the motor vehicle 1 is operating in an open driveline state by using the gearbox engagement state sensor 16 (the gearbox 7 is in neutral or is not in-gear), the cranking speed limit (SLIM) may be set to a first starter motor disengagement speed limit S1 that is mapped as a function of engine coolant temperature (first disengagement speed map) and the starter motor disengagement decision may be based on whether current engine speed (N) exceeds the cranking speed limit (SLIM).

Generally, the driveline may be open when the start is from zero engine speed. The starter motor disengagement logic is extended to add a second starter motor speed limit S2 that is also mapped as a function of engine coolant temperature (second disengagement speed map).

Therefore, in a case when it cannot be confirmed that the motor vehicle 1 is operating in an open driveline state the cranking speed limit (SLIM) may be set to the second starter motor disengagement speed limit S2 obtained from the second disengagement speed map and the starter motor disengagement decision may be based on whether current engine speed (N) exceeds the cranking speed limit (SLIM).

The second disengagement speed map provides a cranking speed limit (SLIM) that is higher than the cranking speed limit (SLIM) obtained from the first disengagement speed map for most engine coolant temperatures.

This allows the first disengagement speed map to be used for open driveline starts, where NVH may be fully optimised, and the second disengagement speed map providing a higher cranking speed limit (SLIM) may be used whenever the driver is likely to be launching the vehicle (closed driveline).

It will be appreciated that the first and second disengagement speed maps may be generated using test results during calibration tests run at the manufacturing facility or during vehicle servicing for a particular engine and may be stored digitally within the electronic controller 20.

FIG. 3 shows one example plot 300 depicting a difference between a first disengagement speed map 302 and second disengagement speed map 304 with respect to engine coolant temperature for a single test engine. The first map 302 may be used to determine the first starter motor speed limit (S1) at which the starter motor may be disengaged while the second map 304 may be used to determine a second starter motor speed limit (S2).

When the engine coolant temperature is below a threshold positive temperature (a temperature close to but above 0° C. such as for example +5 to +25° C.), in the case of this example 10° C., the first and second starter motor speed limits S1 and S2 are substantially the same.

However when the engine coolant temperature is higher than the threshold temperature, there is a marked difference between the first and second starter motor speed limits S1 and S2 with the second starter motor speed limit S2 always being higher than the first starter motor speed limit S1.

Above a threshold second engine coolant temperature (such as 95° C.) the difference between the first and second starter motor speed limits S1 and S2 remains substantially the same (such as within 5%) with the first starter motor speed limit S1 being approximately 400 RPM and the second starter motor speed limit S2 being approximately 500 RPM. The first threshold temperature and the second threshold temperature may be pre-calibrated at the manufacturing plant or a service station based on engine characteristics.

Therefore if the coolant temperature when the starter motor 11 is in use is above the second threshold the cranking speed limit (SLIM) may be set to 400 RPM if it can be confirmed that the driveline is fully open and otherwise it may be set to 500 RPM.

Returning to FIG. 1, after the engine 6 spin-up is complete, the control of the throttle valve 10, the fuelling of the engine and in the case of this example the ignition timing for the engine 6 reverts to a control strategy as required to provide the torque demanded by a user of the engine 6.

In this example, a relationship between engine coolant temperature and engine speed is used as the reference for setting the starter motor disengagement speed limit, it will be appreciated that other engine temperature relationships that affect the speed when disengagement of the starter motor is required may also be used, such as, for example, engine speed versus cylinder block temperature or engine speed versus engine oil temperature.

In this way, the components of FIG. 1 enable a system an engine, a transmission system; and a controller with computer readable instructions stored on non-transitory memory to: in response to an engine restart request during an engine spin-down, during a first condition, cranking an engine via a starter motor until an engine speed increases to a first cranking speed, during a second condition, cranking the engine via the starter motor until the engine speed increases to a second cranking speed, during a third condition, cranking the engine via the starter motor until the engine speed increases to a third cranking speed, and during a fourth condition, cranking the engine via the starter motor until the engine speed increases to a fourth cranking speed, the fourth cranking speed higher than each of the third cranking speed, the second cranking speed, and the first cranking speed. The first condition may include each of a first engine temperature and a neutral position of a gear of the transmission system, and the second condition may include, each of the first engine temperature and a non-neutral position of the gear. The third condition may include each of a second engine temperature and the neutral position of the gear, and the fourth condition may include, each of the second engine temperature and the non-neutral position of the gear, the first engine temperature higher than the second engine temperature.

Figure 2A:
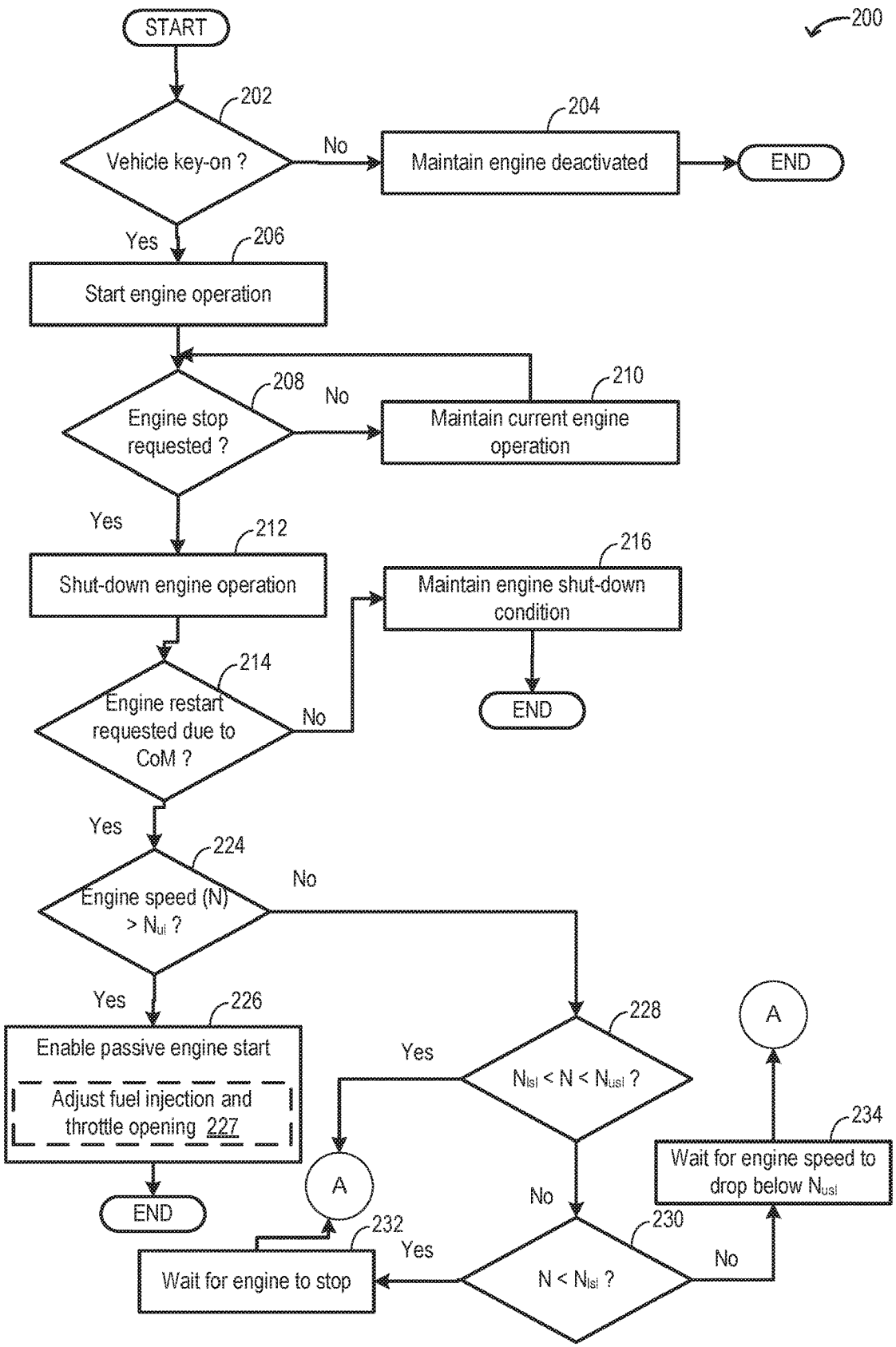
FIGS. 2A-2B show a flow chart illustrating an example method that may be implemented to control shut-down and restarting of an engine during engine spin-down.
Figure 2B:
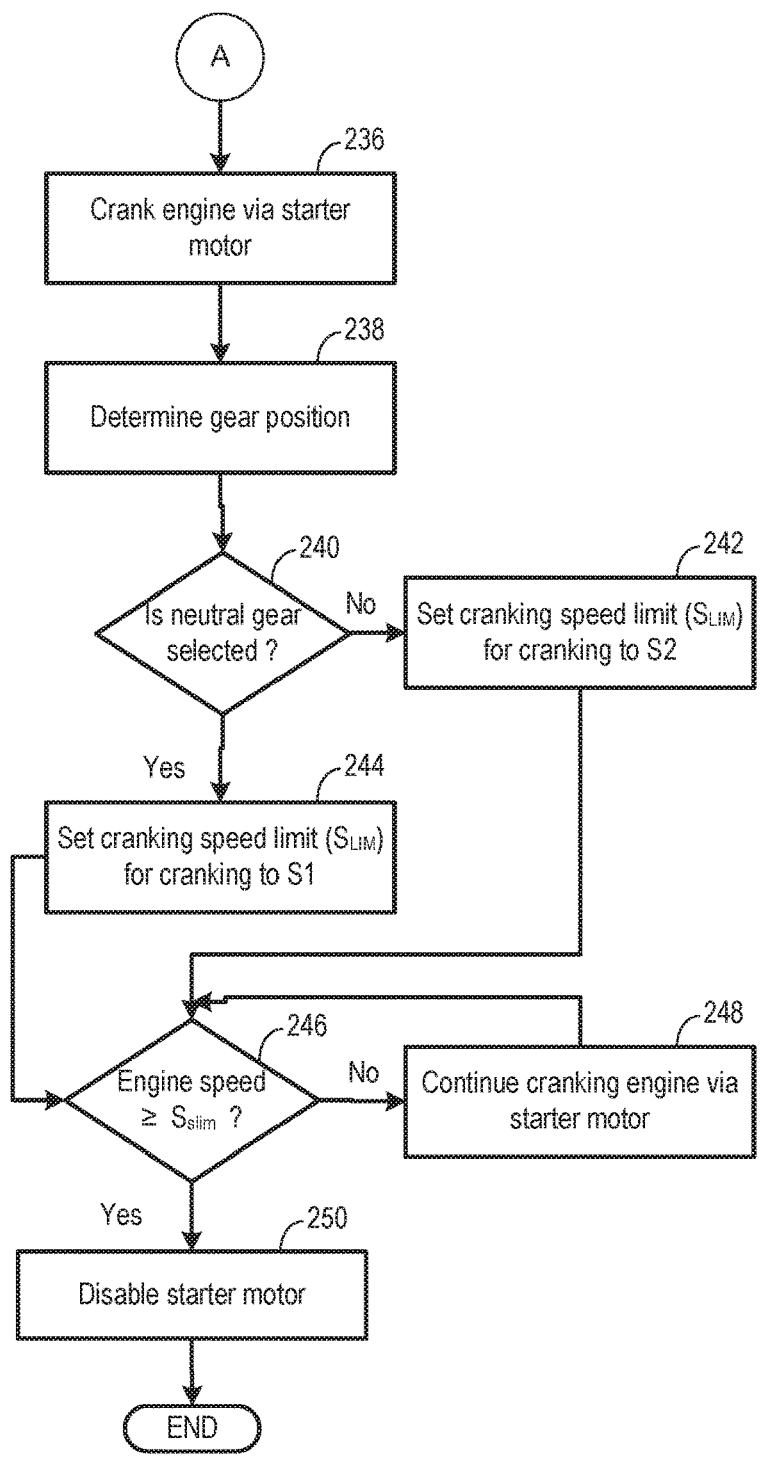

FIGS. 2A-2B shows an example method 200 that can be implemented to adjust engine operation during an engine idle stop and a subsequent restart. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes determining if a vehicle key-on request has been made. A key-on request may include an operator using a key to initiate vehicle operation. For a remote start, a vehicle key-on signal may be received from a source external to the vehicle. The vehicle may be communicatively coupled to an external source such as a key fob, a cellular phone, or a smart phone used for remote engine start via wireless communication. Based on the signal received from the remote source, the controller may schedule the engine start at a requested time.

If a vehicle key-on is not requested, at 204, the engine may be maintained deactivated. Therefore, fuel injection and spark may not be initiated for engine start. If it is determined that a vehicle key-on is requested, at 206, engine operation may be initiated. In one example, the engine may be cracked via a starter motor (such as starter motor 11 in FIG. 1) while opening the throttle valve 10 and providing spark and fuel to the engine 6. It will be appreciated that termination of the cranking may be based upon a fixed engine speed or the engine speed for which cranking is terminated may depend upon whether a driveline of the motor vehicle may be confirmed to be fully open. In one example (elaborated later), if the driveline is fully open (such as when the gear is in neutral position), the starter motor may be operated until the engine speed reaches a first threshold speed. In another example, if the driveline is not fully open (such as when the gear is not in neutral position), the starter motor may be operated until the engine speed reaches a second threshold speed, the second threshold speed higher than the first threshold speed.

At 208, the routine includes determining if engine stop has been requested. It may be determined using the various sensor inputs whether engine idle-stop conditions are met and the engine may be stopped in order to save fuel. In the case of this example, the automatic stop decision (an engine stop request) is made by a stop-start controller formed as part of the electronic controller.

Conditions for engine idle-stop may include engine idling for a longer than threshold duration. For example, engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. Also, the threshold duration may be based on fuel level in the fuel tank. In one example, if the fuel level in the fuel tank is lower than a threshold level, the threshold duration may be decreased such that additional fuel may not be consumed for engine idling.

The driver requested torque may be estimated and confirmation of an engine idle-stop may be initiated in response to a lower than threshold driver requested torque. The vehicle speed may be estimated and assessed whether it is below a predetermined threshold. For example, if the vehicle speed is lower than a threshold (e.g., 3 mph) an engine ide-stop may be requested even if the vehicle is not at rest. Further, an emission control device coupled to the exhaust manifold of engine may be analysed to determine that no request for engine restart was made.

If it is determined that engine stop request has not been made, at 210, current engine operation may be maintained. Fuel injection and spark may be carried out to continue combustion in the engine cylinders. Throttle opening may be regulated based on the torque demand. The driveline may be closed transmitting engine torque to the wheels via the transmission system, and the gear of the transmission system may not be in a neutral position.

If it is determined that engine stop has been requested, at 212, engine operation may be shut down. In one example, engine shut-down comprises cutting or modulating the fuelling of the engine and closing the throttle valve. In another example, the ignition may also be switched off or modulated/altered. In yet another example, both fueling and ignition may be suspended while maintaining the throttle at least partially open.

At 214, the routine includes determining if an engine restart has been requested due to change of mind (CoM). A CoM may occur during the engine spin down (when the engine speed has not yet reduced to zero) when the operator requests for engine torque. Therefore, even before the engine completely spins-down, an engine restart may be requested to meet the torque demand.

If it is determined that engine restart has not been requested during engine spin-down, the engine spin down may be completed. At 216, the engine may be maintained in a shut-down condition without fuel injection.

During a subsequent engine restart, such as when idle-start conditions are met, the engine operation may be restarted by cranking the engine (as previously described in step 206). In one example, engine restart conditions following an engine idle-stop may include an increase in engine load.

If it is determined that engine restart has been requested prior to the engine coming to rest (due to CoM), at 224, the routine includes determining if the current engine speed (N) is above an upper speed limit (NUL) above which the rotational speed of the engine may be sufficient for it to be restarted without the use of the starter motor, a so called 'Passive Start'. The controller may determine engine speed via a crankshaft position sensor and compare the speed to the upper speed limit (NUL). The upper speed limit (NUL) may be pre-calibrated based on engine characteristics such as weight.

If it is determined that the engine speed (N) is higher than the upper speed limit (NUL), at 226, engine passive start may be enabled. Passive Start technique may utilize the inertia of the rotating parts of the engine such as the flywheel. During engine passive start, at 227, fuel injection and throttle valve opening may be adjusted to facilitate engine spin-up. The throttle valve opening may be increased to provide air to the engine and the supply of fuel to the engine may be switched on or re-enabled. Also, ignition may be re-initiated. As an example, the controller may send signals to each of the actuator coupled to the throttle valve to increase throttle opening, the actuator coupled to one or more fuel injectors to initiate fuel injection to the engine cylinders, and to the actuator coupled to the spark plug to initiate ignition, respectively.

If it is determined that the engine speed is not higher than the upper speed limit (NUL)), the routine includes determining if the engine speed is within an engine speed region suitable for starting the engine using the starter motor. The current engine speed (N) may be compared to predetermined upper and lower start speed limits (NUSL) and (NLSL) to determine if the engine speed is higher than a lower start speed limit (NLSL) but lower than an upper start speed limit (NUSL) (NLSL<N<NUSL). In one example, NUL may be circa 600 RPM and NUSL may be circa 250 RPM.

If it is determined that the engine speed is within the engine speed region suitable for starting the engine using the starter motor (such as N lower than NUSL but higher than NLSL), the routine proceeds to step 236 as continued in FIG. 2B. If it is determined that the engine speed is not within NLSL and NUSL, the routine includes determining if the engine speed is lower than the lower start speed limit (NLSL). If it is determined that during the spin-down, the engine has reduced to below NLSL, at 232, the controller may wait for the engine to completely stop (N=zero) before engaging the starter motor. The routine may then proceed to step 236 as continued in FIG. 2B.

If it is determined that the engine speed is not lower than the lower start speed limit (NLSL) and since it has been previously decided that the engine speed is not below the upper start speed limit (NUSL), it may be inferred that the engine speed is higher than NUSL. In one example, the engine speed may be between upper speed limit (NUL) and upper start speed limit (NUSL). At 234, the controller may wait for the engine speed to decrease to below upper start speed limit (NUSL) before engaging the starter motor. If the starter motor is engaged at a higher than NUSL, degradation due to mechanical wear may take place in the starter motor. Once the engine speed reduces to below NUSL, the engine may be cranked using the starter motor as described in step 236 (FIG. 2B).

Continuing to FIG. 2B, at 236, the starter motor may be engaged to crank the engine. The controller may send a signal to an actuator coupled to the starter motor to initiate operation of the starter motor using energy from an on-board battery.

At 238, engagement state of a manual gearbox may be estimated via a gearbox engagement state sensor (such as sensor 16 in FIG. 1). The gear position may be adjusted by the operator using a gear selection mechanism. The gear may be in a neutral position, indicating an open driveline, or the gear may be in a non-neutral position (such as drive, rear, etc.) when the driveline is closed.

At 240, the routine includes determining if a neutral gear has been selected. If it is determined that a neutral gear has been selected during the engine restart, it may be inferred that the driveline is open. At 244, the threshold engine speed (also referred herein as cranking speed limit, SLIM) may be set at a first starter motor disengagement speed limit S1. The controller may determine S1 using a first map of engine speed against engine coolant temperature (line 302 of plot 300 in FIG. 3). As described previously, Si may be a function of engine coolant temperature. The various thresholds described herein may be set through vehicle testing development including calibration operations at appropriate levels, following the guidance provided herein regarding relative relationships between the thresholds, if any.

If it is determined that a neutral gear has not been selected during the engine restart, it may be inferred that the driveline is closed. At 242, cranking speed limit (SLIM) may be set at a second starter motor disengagement speed limit S2. The controller may determine S2 using a second map of engine speed against engine coolant temperature (line 304 of plot 300 in FIG. 3). Similar to S1, S2 may be a function of engine coolant temperature.

Therefore, the map for determining SLIM may be chosen based upon whether or not it can be confirmed that an open driveline state is present with the first map being used for a confirmed fully open driveline and the second map being chosen if it cannot be confirmed that the driveline is fully open.

The value of S1 resulting from the first map is for most engine temperature operating states lower than the value S2 obtained from the second map for the same engine temperature operating state so that when a vehicle launch is likely, the starter motor may be allowed to crank the engine to a higher rotational speed (N) than when it is anticipated that no vehicle launch is to be expected during cranking of the engine.

Therefore, in accordance with this disclosure, the cranking speed limit SLIM may not be a fixed value but may be based upon whether or not the gearbox is or is not in neutral and a predefined relationship between starter motor disengagement speed based upon engine speed and engine coolant temperature.

The relationships of the first and second starter motor disengagement speed limits S1 and S2 verses engine coolant temperature (one example of which is shown in FIG. 3) are stored as maps in a memory of the electronic controller such as the electronic controller.

In the case of an open driveline, the decision on when to disengage the starter motor may be based whether the current engine speed (N) exceeds the cranking speed limit (SLIM) based on the first map comprised of the first starter motor disengagement speed limit S1 mapped as a function of engine coolant temperature.

In the case of a non confirmed open driveline, the decision on when to disengage the starter motor may be based whether the current engine speed (N) exceeds the cranking speed limit (SLIM) based on the second map comprised of the second starter motor disengagement speed limit S2 mapped as a function of engine coolant temperature.

This allows the first map to be used for open driveline starts, where NVH may be fully optimised, and for the second map providing a higher cranking speed limit (SLIM) to be used whenever the driver is likely to be restarting the vehicle with a closed driveline. The proposed solution therefore provides flexibility by calibrating the cranking speed limit (SLIM) differently for open and not confirmed to be open driveline states.

At 246, the routine includes determining if the engine speed is greater than or equal to the cranking speed limit (SLIM). As described above, SLIM may be set to S1 or S2 based on gear position. The starter motor may be disengaged based upon a comparison of the current engine speed (N) with the cranking speed limit (SLIM). If it is determined that the engine speed (N) is lower than the set cranking speed limit (SLIM), at 248, the starter motor may be continued to be operated to crank the engine.

If it is determined that the engine speed (N) is equal to or greater than the set cranking speed limit (SLIM), at 250, then engine cranking may be terminated and the starter motor may be disengaged. The controller may send a signal to the actuator coupled to the starter motor to deactivate the starter motor. In one example, the total cranking time may be 400 ms.

Therefore, in accordance with this disclosure the cranking speed limit (SLIM) may not be a fixed value but may be based upon whether or not it can be confirmed that the driveline is open which in this case is tested by using a gearbox engagement state sensor to provide an indication of whether the gearbox is confirmed to be in neutral or cannot be confirmed to be in neutral. Generally, the driveline is always open, when the start is a restart from zero engine speed and so (SLIM) may be set to the first starter motor speed limit S1. It will be appreciated that the disclosure may be used for any auto-stop situation.

In this way, in response to a request for restarting an engine following an engine idle-stop, a position of a gear may be estimated, and the engine may be selectively cranked, via a starter motor, to a threshold cranking engine speed adjusted based on the position of the gear. The request for restarting the engine may be made during an engine spin-down following the engine idle-stop.

FIG. 4 shows an example timeline 400 illustrating operation of a starter motor. The horizontal (x-axis) denotes time and the vertical markers t1-t9 identify significant times in the routine for engine operation.

The first plot, line 402, shows change in torque demand over time. Torque demand is estimated based on input from pedal position sensor. Line 403 denotes a threshold torque demand. The engine is shut down if the torque demand remains below th threshold torque demand 403 for longer than threshold duration. The threshold torque demand 403 and the threshold duration is pre-calibrated to improve fuel efficiency. The second plot, line 404, shows engine speed as estimated via a crankshaft position sensor. Line Nul denotes an upper engine speed limit above which a starter motor is not engaged to crank the engine and the engine is restarted (while the engine is still spinning-down) by adjusting fueling and throttle opening. Line Nlsl denotes a lower engine start speed limit below which the starter motor is engaged to crank the engine after the engine speed has reduced to zero. Line Nusl denotes an upper engine start speed limit, and the starter motor is engaged to crank the engine during an engine restart if the engine speed is between Nlsl and Nusl. S1 denotes a first starter motor disengagement speed limit and S2 denotes a second starter motor disengagement speed limit. During engine cranking, S1 is the engine speed at which the starter motor is disengaged if a gearbox is in a neutral position while S2 is the engine speed at which the starter motor is disengaged if a gearbox is not in a neutral position. The third plot, line 406, shows fuel injection to one or more engine cylinders. The fourth plot, line 408, shows a gear position as estimated via a gearbox state sensor. The fifth plot, line 410, shows operation of a starter motor.

Prior to time t1, in order to meet the torque demand, the engine is rotated by combusting fuel and air. Since engine cranking is not desired, the starter motor is not engaged. The gear is set to a non-neutral position (such as in a driving gear) by the vehicle operator. At time t1, there is a decrease in torque demand to below the threshold torque demand 403, and correspondingly, the engine speed decreases. Also, the operator shifts the gear to a neutral position.

At time t2, after a threshold duration has elapsed since the decrease in engine torque (time difference between time t1 and t2), the engine is shut-down. In order to shut down the engine, at time t2, fuel injection to the engine cylinders is suspended. The engine is maintained in a shutdown condition between time t2 and t3.

At time t3, even before the engine speed has reduced to zero, in response to an increase in torque demand, the engine is desired to be restarted. Since the engine speed at this time is between Nlsl and Nusl, the starter motor is engaged by the controller to crank the engine. As the gear is in neutral position, the engine is cranked to a first starter motor disengagement S1. Also, the controller sends a signal to the fuel injectors to initiate fuel injection to the engine cylinders.

At time t4, in response to the engine speed increasing to S1, the controller sends a signal to an actuator coupled to the starter motor to disengage the starter motor. Also, at time t4, the gear is shifted from the neutral position. Between time t4 and t5, the engine is operated to meet the torque demand.

At time t5, the torque demand decreases to below the threshold torque demand 403, and correspondingly, the engine speed also decreases. At time t6, after a threshold duration has elapsed since the decrease in engine torque (time difference between time t6 and t5 is equal to the time difference between time t2 and t1), the engine is shut-down. In order to shut down the engine, at time t6, fuel injection to the engine cylinders is suspended. The engine is maintained in a shutdown condition between time t6 and t7.

At time t7, during the engine spin-down, in response to an increase in torque demand, an engine restart is desired. However, the engine speed at this time is above Nusl but below Nul. Therefore, the starter motor cannot engaged by the controller to crank the engine. Between time t7 and t8, the engine speed gradually decreases to Nusl.

At time t8, in response to the engine speed reaching Nusl, the starter motor is engaged to crank the engine. However, at this time, the gear is not at a neutral position. Therefore, the engine is cranked to the second starter motor disengagement S2. Also, the controller sends a signal to the fuel injectors to initiate fuel injection to the engine cylinders.

At time t9, in response to the engine speed increasing to S9, the controller sends a signal to an actuator coupled to the starter motor to disengage the starter motor. After time t9, the engine is operated (without assistance from the starter motor) to provide the demanded torque.

In this way, by adjusting a threshold engine speed for engine cranking during an engine spin-down based on a position of the gear, engine spin-up time may be improved. The technical effect of using distinct starter motor disengagement speed is that noise, vibration, harshness (NVH) may be reduced during engine restart. Overall, by adjusting the distinct engine restart speeds based on engine temperature and gear ratio, engine restart may be improved and starter motor degradation may be reduced.

It will be appreciated that other techniques could be used to establish whether the driveline is fully open such as for example, a transmitted torque sensor or a clutch engagement state sensor associated with the friction clutch connecting the engine to the gearbox. It will also be appreciated that the disclosure could also be used for clutched automatic transmissions where a main drive clutch is not necessarily fully disengaged when starting commences.

It will be appreciated by those skilled in the art that, although the disclosure has been described by way of example with reference to one or more embodiments, it is not limited to the disclosed embodiments and that, one or more modifications to the disclosed embodiments or alternative embodiments could be constructed without departing from the scope of the invention as defined in the accompanying claims.

An example method for controlling a starter motor of a powertrain system having an engine and a driveline including a gearbox driven by the engine via a friction clutch comprises: when there is requirement to use the starter motor to restart the engine following a change of mind during an automated engine stop, using the starter motor to crank the engine and disengaging the starter motor when a cranking speed limit is reached, wherein the cranking speed limit is based upon whether the driveline is confirmed to be fully open. In any preceding example, additionally or optionally, the cranking speed limit is a first cranking speed limit when the driveline is confirmed to be fully open and wherein the cranking speed limit is a second cranking speed limit when the driveline is not confirmed to be fully open. In any or all of the preceding examples, the method further comprising, additionally or optionally, estimating a state of the driveline and, in response to the state of the driveline being fully open, setting the cranking speed limit to the first cranking speed limit and in response to the state of the driveline not being open, setting the cranking speed limit to the second cranking speed limit. In any or all of the preceding examples, additionally or optionally, estimating the state of the driveline comprises estimating whether a gearbox is in neutral via a gearbox engagement state sensor. In any or all of the preceding examples, additionally or optionally, the state of the driveline is estimated to be fully open in response to the gearbox being in a neutral position, and the state of the driveline is estimated to not being open in response to the gearbox not being in the neutral position. In any or all of the preceding examples, additionally or optionally, each of the first cranking speed limit and the second cranking speed limit is based on each of an engine speed and an engine temperature. In any or all of the preceding examples, additionally or optionally, the second cranking speed limit is higher than the first cranking speed limit when the engine temperature is above a threshold temperature.

Another engine example method comprises: in response to a request for restarting an engine following an engine idle-stop, estimating a position of a gear, and selectively cranking the engine, via a starter motor, to a threshold cranking engine speed adjusted based on the position of the gear. In any preceding example, additionally or optionally, the request for restarting the engine is during an engine spin-down. In any or all of the preceding examples, additionally or optionally, selectively cranking the engine includes disabling the starter motor in response to an engine speed increasing to the threshold cranking speed. In any or all of the preceding examples, additionally or optionally, the threshold cranking speed is a first cranking speed when the position of the gear is neutral, and wherein the threshold cranking speed is a second cranking speed when the position of the gear is not neutral. In any or all of the preceding examples, additionally or optionally, the second threshold cranking speed is higher than the first cranking speed. In any or all of the preceding examples, additionally or optionally, each of the first threshold cranking speed and the second threshold cranking speed is a function of engine coolant temperature. In any or all of the preceding examples, additionally or optionally, selectively cranking the engine includes, responsive to the request for restarting the engine being received prior to engine spin-down, cranking the engine via the starter motor during engine speed being between a first threshold engine speed and a second threshold engine speed, the second threshold engine speed higher than the first threshold engine speed. In any or all of the preceding examples, the method further comprises, additionally or optionally, in response to the engine speed being below the first threshold engine speed, cranking the engine via the starter motor after engine spin-down is complete. In any or all of the preceding examples, the method further comprising, additionally or optionally, in response to the engine speed being higher than a third threshold engine speed, increasing throttle opening without cranking the engine via the starter motor, the third threshold engine speed being higher than the second threshold engine speed, and in response to the engine speed being each of lower than the third threshold engine speed and higher than the second threshold engine speed, cranking the engine via the starter motor upon the engine speed decreasing to the second threshold engine speed.

In yet another example, a vehicle system comprises: an engine, a transmission system, and a controller with computer readable instructions stored on non-transitory memory to: in response to an engine restart request during an engine spin-down, during a first condition, cranking an engine via a starter motor until an engine speed increases to a first cranking speed, during a second condition, cranking the engine via the starter motor until the engine speed increases to a second cranking speed, during a third condition, cranking the engine via the starter motor until the engine speed increases to a third cranking speed, and during a fourth condition, cranking the engine via the starter motor until the engine speed increases to a fourth cranking speed, the fourth cranking speed higher than each of the third cranking speed, the second cranking speed, and the first cranking speed. In any preceding example, additionally or optionally, the first condition includes each of a first engine temperature and a neutral position of a gear of the transmission system, and wherein the second condition includes, each of the first engine temperature and a non-neutral position of the gear, the neutral position of the gear is estimated via a gear position sensor coupled to a gearbox of the transmission system. In any or all of the preceding examples, additionally or optionally, the third condition includes each of a second engine temperature and the neutral position of the gear, and wherein the fourth condition includes, each of the second engine temperature and the non-neutral position of the gear, the first engine temperature higher than the second engine temperature. In any or all of the preceding examples, additionally or optionally, the third cranking speed is lower than the fourth cranking speed and higher than each of the second cranking speed and the first cranking speed, and wherein the second cranking speed is lower than the third cranking speed and higher than the first cranking speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a starter motor of a powertrain system having an engine and a driveline including a gearbox driven by the engine via a friction clutch comprising: when there is requirement to use the starter motor to restart the engine following a change of mind during an automated engine stop, using the starter motor to crank the engine and disengaging the starter motor when a cranking speed limit is reached wherein the cranking speed limit is based upon whether the driveline is confirmed to be fully open.

2. The method of claim 1, wherein the cranking speed limit is a first cranking speed limit when the driveline is confirmed to be fully open and wherein the cranking speed limit is a second cranking speed limit when the driveline is not confirmed to be fully open.

3. The method of claim 2, further comprising, estimating a state of the driveline and, in response to the state of the driveline being fully open, setting the cranking speed limit to the first cranking speed limit and in response to the state of the driveline not being open, setting the cranking speed limit to the second cranking speed limit.

4. The method of claim 3, wherein estimating the state of the driveline comprises estimating whether a gearbox is in neutral via a gearbox engagement state sensor.

5. The method of claim 4, wherein the state of the driveline is estimated to be fully open in response to the gearbox being in a neutral position, and the state of the driveline is estimated to not being open in response to the gearbox not being in the neutral position.

6. The method of claim 2, wherein each of the first cranking speed limit and the second cranking speed limit is based on each of an engine speed and an engine temperature.

7. The method of claim 2, wherein the second cranking speed limit is higher than the first cranking speed limit when the engine temperature is above a threshold temperature.

8. A method, comprising:
in response to a request for restarting an engine following commencing an engine idle-stop,
estimating a position of a gear, and
selectively cranking the engine, via a starter motor, to a threshold cranking engine speed adjusted based on the position of the gear.

9. The method of claim 8, wherein the request for restarting the engine is during an engine spin-down.

10. The method of claim 8, wherein selectively cranking the engine includes disabling the starter motor in response to an engine speed increasing to the threshold cranking speed.

11. The method of claim 8, wherein the threshold cranking speed is a first cranking speed when the position of the gear is neutral, and wherein the threshold cranking speed is a second cranking speed when the position of the gear is not neutral.

12. The method of claim 10, wherein the second threshold cranking speed is higher than the first cranking speed.

13. The method of claim 8, wherein each of the first threshold cranking speed and the second threshold cranking speed is a function of engine coolant temperature.

14. The method of claim 8, wherein selectively cranking the engine includes, responsive to the request for restarting the engine being received prior to engine spin-down, cranking the engine via the starter motor during engine speed being between a first threshold engine speed and a second threshold engine speed, the second threshold engine speed higher than the first threshold engine speed.

15. The method of claim 14, further comprising, in response to the engine speed being below the first threshold engine speed, cranking the engine via the starter motor after engine spin-down is complete.

16. The method of claim 15, further comprising, in response to the engine speed being higher than a third threshold engine speed, increasing throttle opening without cranking the engine via the starter motor, the third threshold engine speed being higher than the second threshold engine speed, and in response to the engine speed being each of lower than the third threshold engine speed and higher than the second threshold engine speed, cranking the engine via the starter motor upon the engine speed decreasing to the second threshold engine speed.

17. A vehicle system, comprising:
an engine;
a transmission system; and
a controller with computer readable instructions stored on non-transitory memory to:
in response to an engine restart request during an engine spin-down,
during a first condition, cranking an engine via a starter motor until an engine speed increases to a first cranking speed,
during a second condition, cranking the engine via the starter motor until the engine speed increases to a second cranking speed,
during a third condition, cranking the engine via the starter motor until the engine speed increases to a third cranking speed, and
during a fourth condition, cranking the engine via the starter motor until the engine speed increases to a fourth cranking speed, the fourth cranking speed higher than each of the third cranking speed, the second cranking speed, and the first cranking speed.

18. The system of claim 17, wherein the first condition includes each of a first engine temperature and a neutral position of a gear of the transmission system, and wherein the second condition includes, each of the first engine temperature and a non-neutral position of the gear, the neutral position of the gear is estimated via a gear position sensor coupled to a gearbox of the transmission system, wherein the engine operates in each of the first, second, third, and fourth conditions.

19. The system of claim 18, wherein the third condition includes each of a second engine temperature and the neutral position of the gear, and wherein the fourth condition includes, each of the second engine temperature and the non-neutral position of the gear, the first engine temperature higher than the second engine temperature.

20. The system of claim 17, wherein the third cranking speed is lower than the fourth cranking speed and higher than each of the second cranking speed and the first cranking speed, and wherein the second cranking speed is lower than the third cranking speed and higher than the first cranking speed.

* * * * *